March 19, 1940.  J. A. VALENTINE  2,194,059
PRISM ATTACHMENT FOR CAMERAS
Filed Oct. 18, 1937  2 Sheets-Sheet 1

Inventor
Joseph A. Valentine
By Lyon & Lyon
Attorneys

March 19, 1940.    J. A. VALENTINE    2,194,059
PRISM ATTACHMENT FOR CAMERAS
Filed Oct. 18, 1937    2 Sheets-Sheet 2

Inventor
Joseph A. Valentine
By Lyon & Lyon
Attorneys

Patented Mar. 19, 1940

2,194,059

UNITED STATES PATENT OFFICE 2,194,059

PRISM ATTACHMENT FOR CAMERAS

Joseph A. Valentine, Los Angeles, Calif., assignor to Universal Pictures Company, Inc., Universal City, Calif., a corporation of Delaware Application October 18, 1937, Serial No. 169,545

1 Claim. (Cl. 88—1)

This invention relates to means for producing unusual photographic effects in motion picture photography as well as in still photography. More specifically, the invention relates to means including a prism positioned between the photographic lens and the objective field whereby the images impressed upon the photographic emulsion may be caused to include an image of the object being photographed and in addition thereto an image of that same object in an inverted position so related to the other image as to resemble a reflection thereof in a floor or the like.

Upon adjusting and manipulating the prism means embodied in this invention, various other effects may be created and those skilled in the art will become readily cognizant of the variety of uses to which this invention may be put.

It is an object of this invention, therefore, to disclose and provide means whereby two images of a given object or scene may be simultaneously formed upon a photographic emulsion or elsewhere by means of one lens, the two images thus formed bearing a desired and predetermined relation to each other.

Another object is to provide prism means adjustably positionable between a lens and an objective field whereby the object or scene being photographed will appear on the photographic emulsion accompanied by a reflection or an inverted image of said object or scene.

A further object of the invention is to disclose and provide a device which may be readily attached to any form of camera, said device being capable of producing desired photographic effects.

These and other objects, uses, advantages, adaptations and modifications of the invention will become apparent to those skilled in the art from the following detailed description, reference being made to the appended drawings which, for illustrative purposes, depict one suitable form of device.

Figure 1:
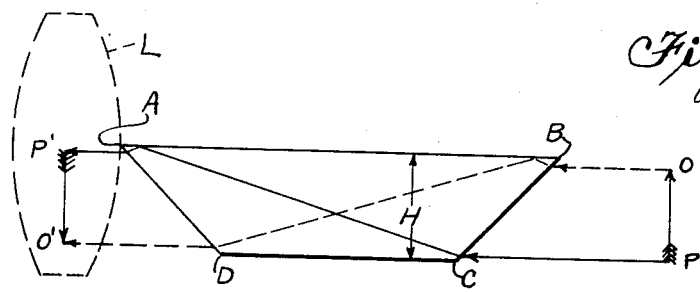
Fig. 1 is a diagrammatic representation in side elevation of the prism device.

By referring to Fig. 1, the general relation between the prism and a photographic lens will be seen. The prism is preferably provided with a plane upper surface AB and with a bottom such as the plane CD. Attention is called to the fact that the rear edge A of the prism is in virtual contact with the front surface of the lens L and such edge A practically intersects the optical axis of the lens, the top plane AB of the prism lying in a plane which may either pass through the optical axis or slightly below the same. The upper half of the lens L should not be obstructed by the prism but the lower half is preferably capable of receiving only light which passes through the prism. The front and rear surfaces or faces of the prism, such as the faces BC and AD, preferably lie in planes transverse to the optical axis of the lens and at substantially complementary angles to the top plane AB. As shown, the front face BC is at an angle of 45° to the top plane AB and the rear face AD is at a similar angle. It is not necessary that these angles be precisely 45°, however, as similar results can be obtained by using either larger or smaller angles. In all instances, however, the front and rear faces BC and AD should be oppositely inclined and directed downwardly and toward each other from the top plane AB. The thickness of the prism, indicated by H, should be substantially equivalent to one-half the diameter of the lens L, particularly in the rear portions of the prism, since the front portion of the prism may be of greater thickness.

The width of the prism (measured in a direction transverse to the optical axis of the lens) may vary from a width at the edge A substantially equivalent to the diameter of the lens L to a greater width at the forward edge B, the width at the forward edge B being dependent somewhat upon the angle of view of the lens L.

By referring to Fig. 1, it will be seen that rays of light from an object OP in the objective field will be refracted and reflected by the prism so that the object appears in inverted position to the lens L. The paths of light rays from an object OP are traced in Fig. 1 and it will be seen that such rays are refracted upon entering the prism and directed toward the upper or top plane surface AB. When the entering and rear faces of the prism are at angles of say from 30° to about 50°, the light will strike the upper surface AB at a sufficiently small angle so that the light will not pass upwardly through the plane AB even though the prism is not internally surfaced at such plane. The light is then downwardly reflected and then emerges through the rear face AD, the rays now occupying an inverted position as indicated by O'P'. The length of the prism, i. e., the distance from front to rear, should be sufficient so that light from infinity entering the prism at near its bottom edge, as for example, near the point C, will not strike the rear face AD but instead will strike the top plane AB, as shown in Fig. 1. When the entering and exit faces are at about 45° and the prism is made of glass having an index of refraction of say 1.52, then the top length AB should be about 2.1 times the diameter of the lens.

Figure 2:
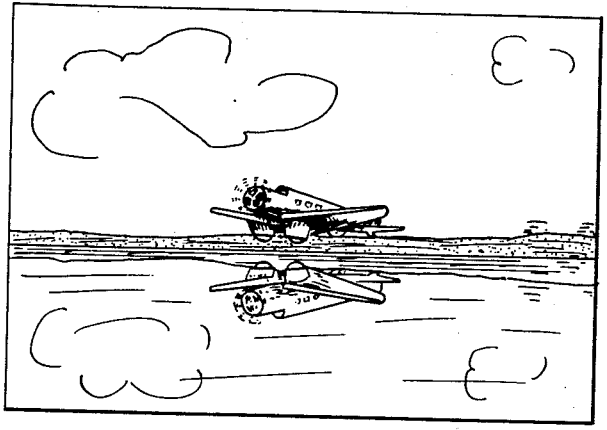
Fig. 2 represents the type of image which may be obtained by means of this invention.

In actual practice, the upper half of the lens L receives rays directly from the object and therefore produces an image in the normal manner. All rays from this object which enter through the entering face of the prism are supplied to the lens L in an inverted position so that a secondary image is formed, this secondary image being practically identical to the first but inverted with respect thereto. As shown in Fig. 2, for example, the airplane was photographed in the normal manner on a landing field but by reason of the prism, a reflection of the plane was obtained, thereby creating the impression that the plane is landing on water in which the reflection is perfectly visible. In many instances, particularly in cabaret scenes, etc., the studios have built floors made of mirrors but the expense of doing this is entirely obviated by means of the device of this invention since suitable reflections simulating a mirror floor may be obtained by the use of the device herein described.

Figure 5:
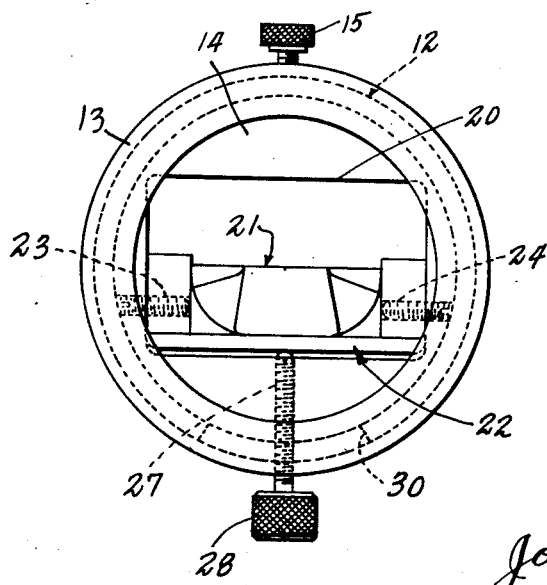
Fig. 5 is a rear elevation.
Figure 3:
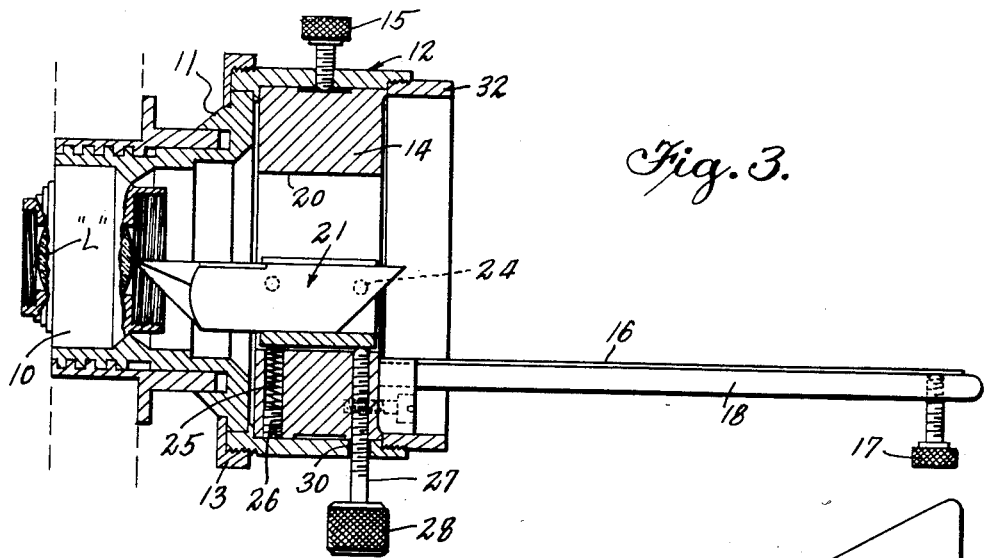
Fig. 3 is a side elevation, partly in section, showing the device as applied to a motion picture camera lens.
Figure 4:
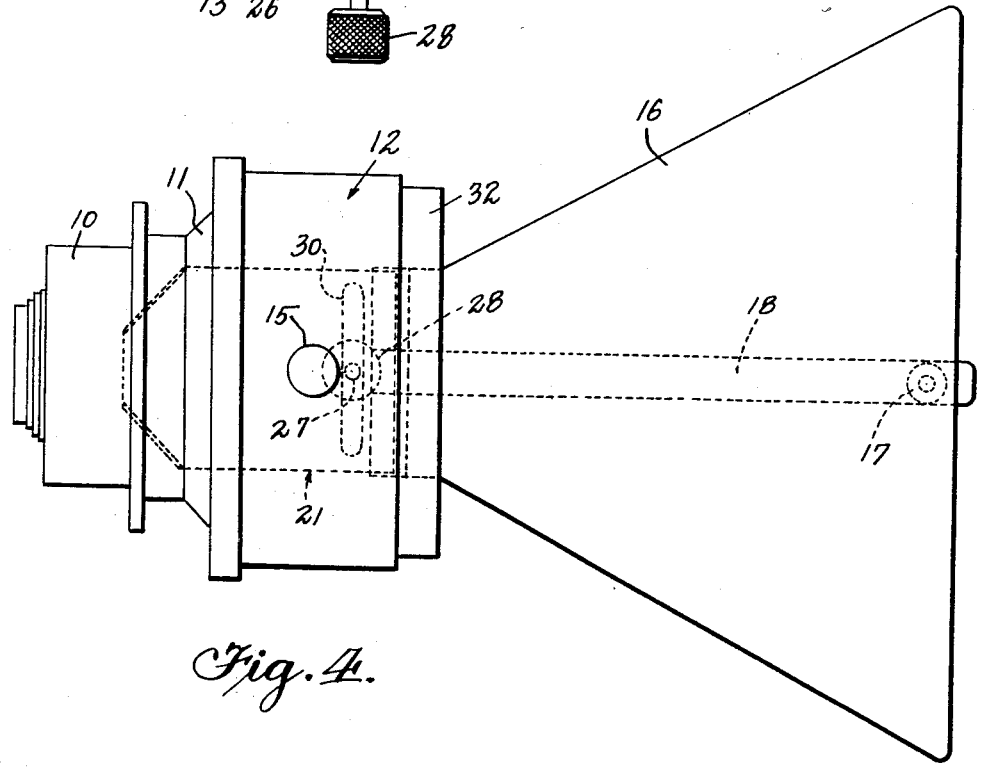
Fig. 4 is a plan view of the device.

By referring to Fig. 3, the general arrangement of the device with respect to a camera lens will be seen. The lens in its holder 10 is positioned within a hood 11 having an outwardly flaring, substantially conical inner surface covered with a nonactinic, nonreflecting finish. This hood carries the prism casing 12 to which it is attached by means of the gland 13. The casing 12 is provided with a circular bore in which is mounted a rotatable holder 14 which may be clamped in position by means of the screw 15. The rotatable holder 14 may carry a septum or limiting screen 16 extending forwardly at a plane below the prism and lens, the outer edge of the screen 16 being adjustably supported by means of the adjusting screw 17 carried by a member 18 extending from the holder 14. The holder 14 is provided with a rectangular opening 20 extending therethrough in an axial direction. The prism 21 is positioned in the lower portion of this opening and may be supported by a cradle 22 (see Fig. 5) mounted on horizontally extending pins 23 and 24 extending inwardly from the holder 14. The rear edge of the bottom portion of the cradle 22 is upwardly urged by means of a balancing spring 25 retained within a bore formed in the holder 14, the spring being retained in said bore by means of a screw 26. The forward edge of the bottom portion of the cradle 22 rests upon the end of a balancing screw 27 threadedly mounted in an internally threaded bore formed in the holder 14, the screw 27 being provided with a knurled knob 28.

By adjusting the balancing screw 27 by means of the knob 28, the cradle 22 and the prism 21 carried thereby may be partially rotated upon the pins 23 and 24 so as to adjust the inclination or plane of the top surface of the prism. The screw 27 extends through a radial slot 30 formed in the casing 12 so that the entire holder 14, together with its cradle and prism, may be partly rotated within the casing 12 and then locked in the desired position by means of the locking or clamping screw 15 which extends through the casing and bears against the outer surface of the cylindrical holder 14.

In actual practice, the outer and lower surfaces of the prism 21 are blackened and if desired such surfaces may be internally silvered. The side surfaces of said prism may also be blackened. In the particular form of prism shown the prism is provided with parallel sides for a large portion of its length and with tapered sides at the rear adjacent the lens but this particular form of side and back construction is not critical.

Attention is called to the fact that the holder 14 is retained within the casing by means of a retaining ring 32 threaded into the end of the casing 12 and into abutting relation with the forward side of the holder 14. During partial rotation of the holder 14 the limiting screen 16 and the supporting member 18 will be simultaneously moved with the holder. As shown in the plan view, the limiting screen is relatively wide at its forward edge and then tapers gradually to the opening 20 formed in the holder 14.

Although a particular structure has been described, it is to be understood that various changes and modifications may be made therein without departing from the teachings of this invention. Any suitable holder, carriage, cradle or other means may be used in suitably supporting and adjusting the prism into position before the lens of the camera, in accordance with the general teachings expressed in the first portion of this specification.

I claim:

In a camera, the combination of an objective lens, a single prism positioned in front of said lens and between said lens and an objective field, said prism being provided with a top plane surface and a bottom surface and front and rear faces, said front and rear faces being inclined downwardly and toward each other from said top plane surface, said top plane surface lying in a plane passing virtually along the optical axis of the lens, the rear edge of said top plane surface being substantially in contact with the lens, said prism being of a thickness substantially equivalent to one-half the diameter of the lens, a width adjacent said lens substantially equivalent to the diameter of the lens and a length of more than twice the diameter, means for partially rotating said prism around the optical axis of the lens, and means for adjustably positioning said prism about an axis transverse to the optical axis of the lens.

JOSEPH A. VALENTINE.